United States Patent [19]
Barzuza

[11] Patent Number: 5,549,825
[45] Date of Patent: Aug. 27, 1996

[54] LIQUID FILTER STRUCTURE

[75] Inventor: Ytzhak Barzuza, la Frankfurter Street, Petach Tikvah, Israel

[73] Assignees: Filtration Ltd., Herzla; Ytzhak Barzuza, Petach Tikvah, both of Israel

[21] Appl. No.: 331,797

[22] Filed: Oct. 31, 1994

[30] Foreign Application Priority Data

Nov. 1, 1993 [IL] Israel ........................................ 107457

[51] Int. Cl.⁶ ................................................... B01D 39/10
[52] U.S. Cl. .......................... 210/411; 210/484; 210/487; 210/489; 210/497.01; 210/499
[58] Field of Search ..................... 210/411, 455, 210/485, 497.01, 499, 484, 487, 489, 493.1, 493.5, 494.1, 494.2, 494.3, 497.1

[56] References Cited

U.S. PATENT DOCUMENTS

| | | | |
|---|---|---|---|
| 1,945,839 | 2/1934 | Maltitz | 210/411 |
| 3,028,971 | 4/1962 | Peterson. | |
| 3,177,637 | 4/1965 | Davis | 210/485 |
| 3,788,252 | 1/1974 | Marforio. | |
| 4,358,371 | 11/1982 | Jameson et al. | 210/485 |

FOREIGN PATENT DOCUMENTS

| | | | |
|---|---|---|---|
| 2141785 | 1/1973 | France. | |
| 658405 | 11/1986 | Switzerland | 210/497.01 |
| 1273251 | 5/1972 | United Kingdom. | |

Primary Examiner—Matthew O. Savage
Attorney, Agent, or Firm—Greenblum & Bernstein P.L.C.

[57] ABSTRACT

A filter screen structure for a backflushed liquid filter has a screen separating the raw-liquid side of the filter from the clean-liquid side thereof, including at least one row of substantially parallel rods extending along the screen, wherein the screen is threaded between the rods, partially enveloping the rods alternately from the raw-liquid side of the filter and from the clean-liquid side thereof. At least some of the rods are provided with substantially circumferential groove-like recesses, facilitating the passage of the liquid from the raw-liquid side via the screen to the clean-liquid side.

12 Claims, 5 Drawing Sheets

LIQUID FILTER STRUCTURE

The present invention relates to a liquid filter structure, especially for backflushed filter screens.

Backflushed screens are exposed to two different forces acting in opposite directions, one being the direction of the main flow, the other the direction of the backflush. These opposite forces create a fatigue effect which, eventually, is liable to break the screen. Such a break is most likely to occur at stress concentration points which, with corrugated filter screens, are located at the corrugation edges.

It is one of the objects of the present invention to provide a novel type of filter screen structure which is largely free of stress concentration points and will therefore ensure a substantially extended service life of the screen.

According to the invention, this objective is achieved by providing a filter screen structure for a backflushed liquid filter having a screen separating the raw-liquid side of said filter from the clean-liquid side thereof, comprising at least One row of substantially parallel rods extending along said screen, wherein said screen is threaded between said rods, partially enveloping said rods alternatingly from the raw-liquid side of said filter and from the clean-liquid side thereof, at least some of said rods being provided with substantially circumferential groove-like recesses, facilitating the passage of said liquid from said raw-liquid side via said screen to said clean-liquid side.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
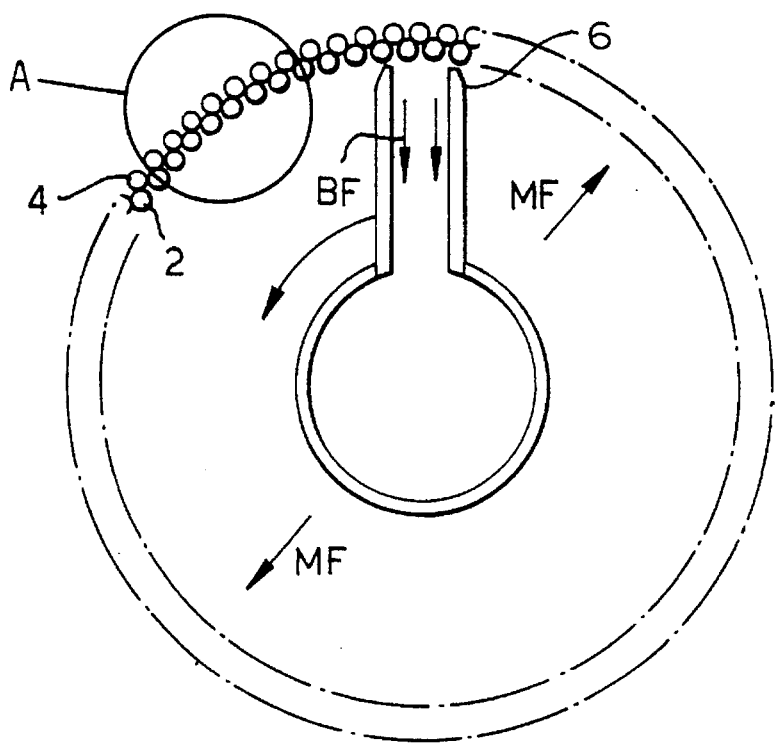
FIG. 1 is a schematic end view of a cylindrical filter screen structure according to the invention.
Figure 2:
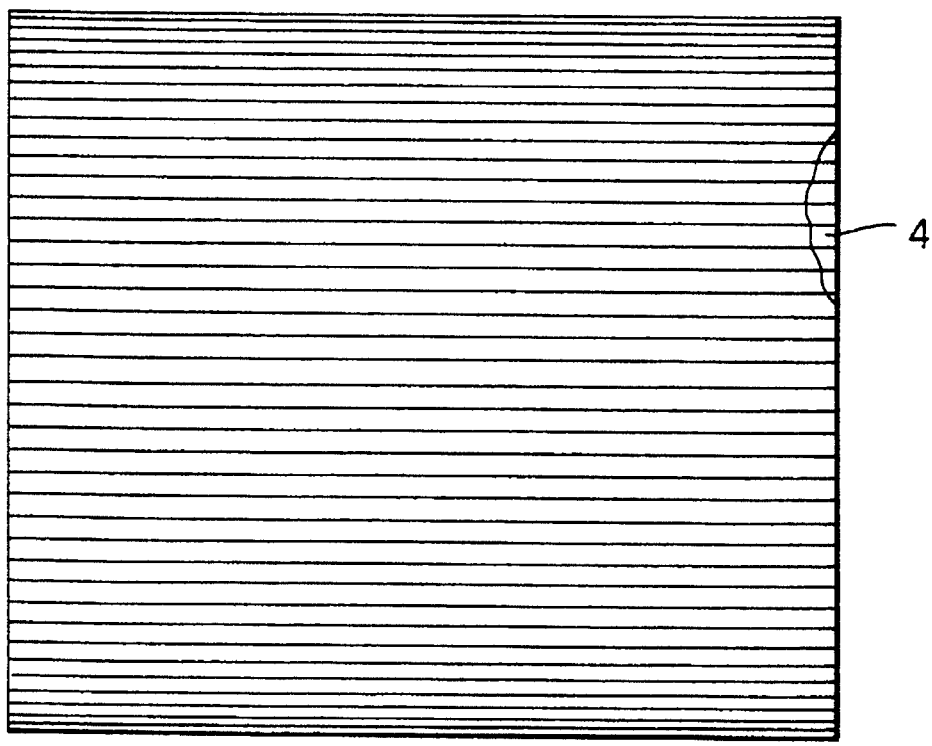
FIG. 2 is a side view of the structure of FIG. 1.

Referring now to the drawings, there is seen in FIG. 1 a schematic representation of a first embodiment of the filter screen structure according to the invention, comprising two rows constituted of a plurality of rods 2 and 4, arranged along concentric circles and mutually offset by half their angular pitch, thus forming a cylindrical structure as seen in the side view of FIG. 2, within which is arranged a per se known rotary suction nozzle 6 that produces the backflushing flow in the direction of arrows BF. The filtering or main flow is in the direction of arrows MF, i.e., in the radial direction outwards.

Figure 3:
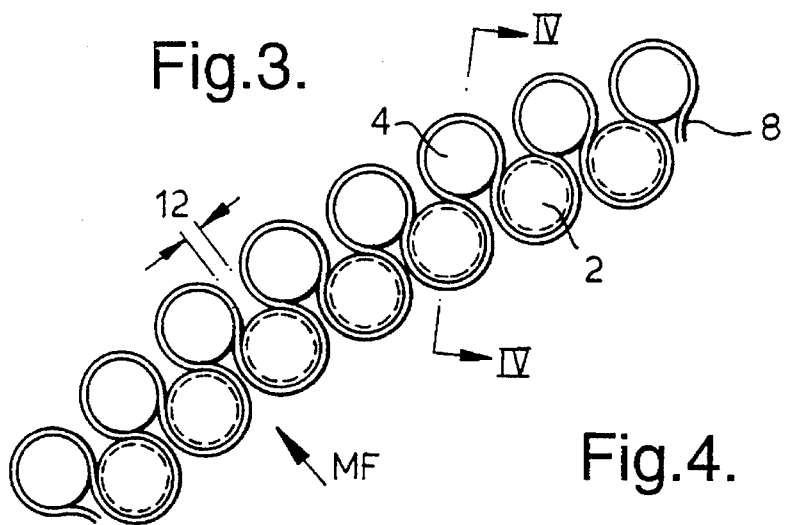
FIG. 3 represents the enlarged detail A of FIG. 1.

Because of the small scale of FIG. 1, the filtering screen 8 itself can only be seen in the enlarged detail A of FIG. 3, which also shows the relative positions of the rods 2 and 4, and the screen 8. It is seen that the screen 8 alternatingly threads, or meanders, between the rods 2 and the rods 4, which thus support the screen 8 and thereby prevent the above-mentioned destructive, fatigue-producing alternating stresses.

Figure 4:
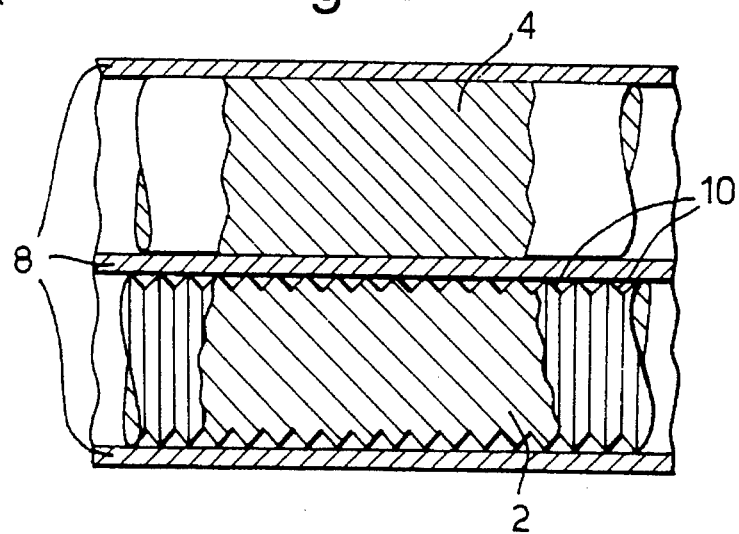
FIG. 4 shows a still further enlarged view, in cross-section along plane IV—IV of FIG. 3.
Figure 5:
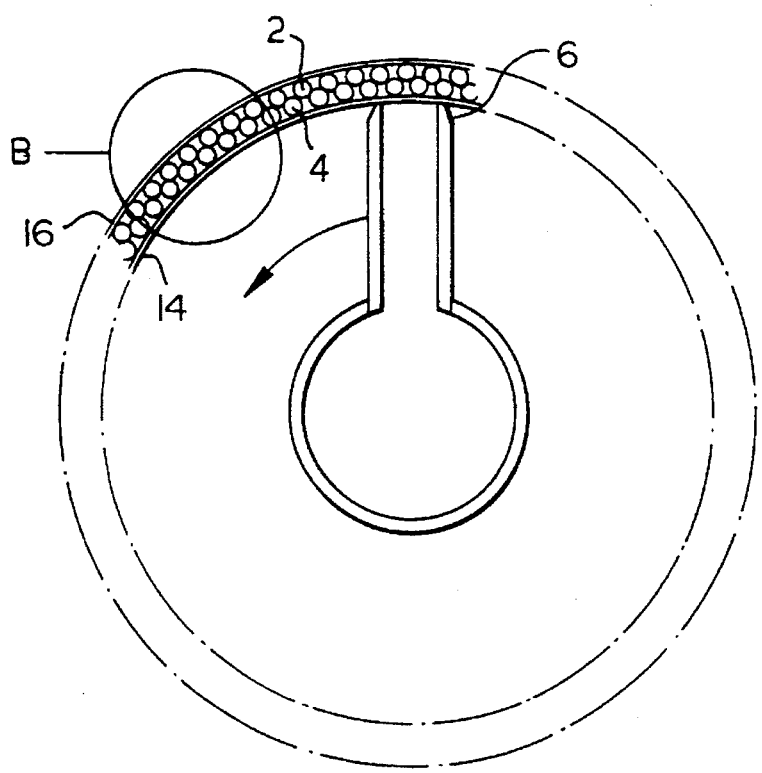
FIG. 5 is an end view of a variant of the cylindrical filter structure of FIG. 1.
Figure 6:
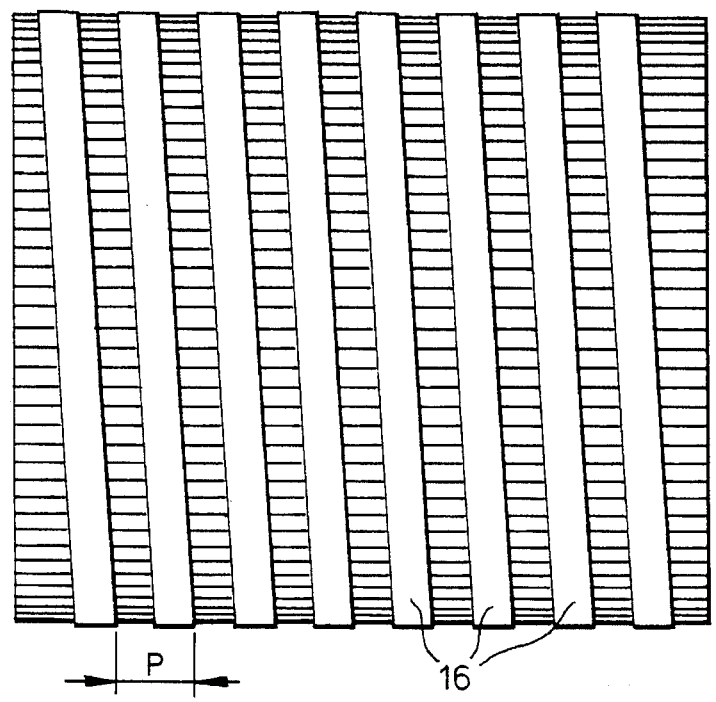
FIG. 6 is a side view of the structure of FIG. 5, showing the reinforcing belting.
Figure 7:
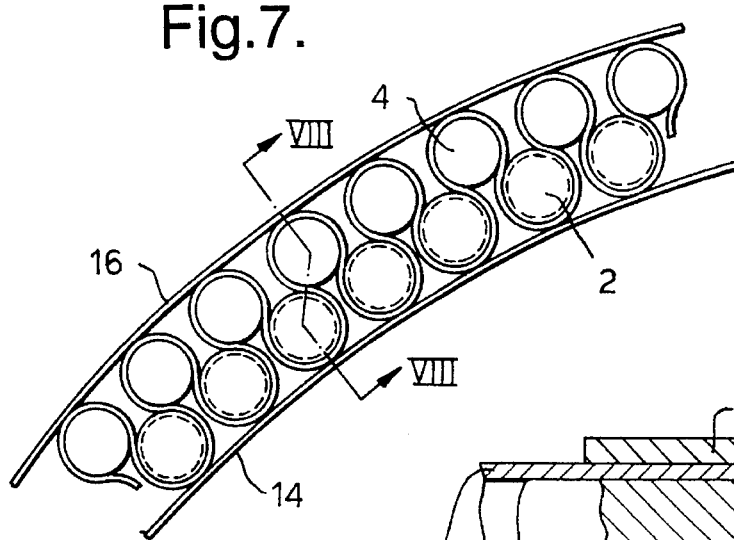
FIG. 7 represents the enlarged detail B of FIG. 5, showing the protective internal grid and the reinforcing belting.
Figure 8:
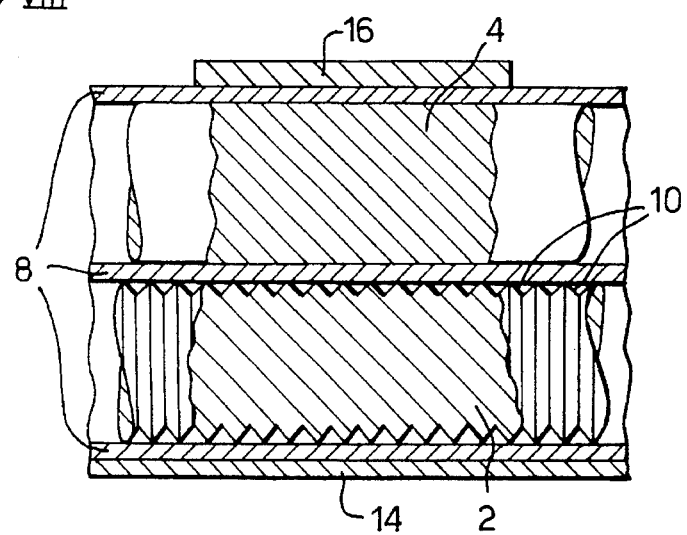
FIG. 8 shows a still further enlarged view, in cross-section along plane VIII—VIII of FIG. 7.

The answer to the question as to how the water passes the "barrier" ostensibly constituted of the rods 2 and 4 is given in the further enlarged representation of FIG. 4, where the rods 2 are seen to be circumferentially grooved, the water having passed through the screen 8 which, to a large extent, envelops the rod 2. The water flows through grooves or recesses 10, thus reaching the clean-water space of the filter via the gaps 12 between the rods 4. (In FIG. 3, the bottoms of grooves 10 are indicated by broken lines.) The rods 4 of the outer row are preferably without grooves 10, as it would be difficult to extract, by suction, any solids caught between the rods 4 and the screen 8.

A variant of the embodiment of FIGS. 1–4 is seen in FIGS. 5–8, in which the filter screen structure described above is mechanically reinforced by two additional elements: at the inside, by a protective grid 14 and, at the outside, by belting 16 helically wrapped around the filter screen structure at a pitch P substantially larger than the width of the belting, thus not interfering with the filtering flow from inside the filter screen structure to the outside thereof.

While a helically wrapped-around piece of belting has practical advantages, a reinforcing effect can also be achieved by several separate, spaced-apart belts individually tightened around the screen structure.

Figure 9:
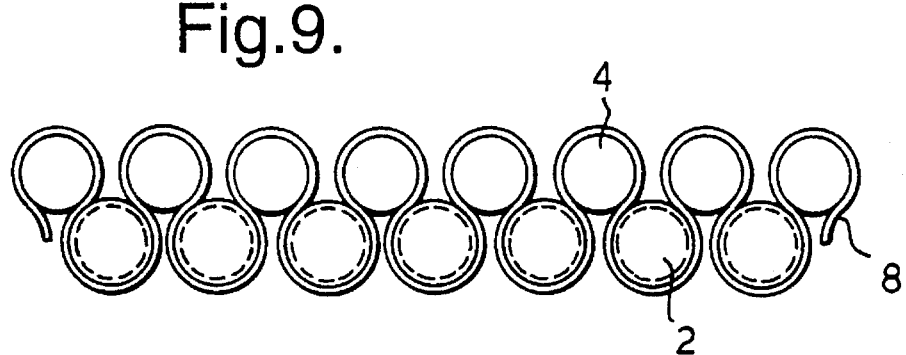
FIG. 9 is a schematic end view of a plane filter structure according to the invention.

FIG. 9 represents a planar configuration of the filter screen structure according to the invention, with the rods 2 and 4 arranged along two parallel lines and being mutually offset by half their linear pitch.

Figure 10:
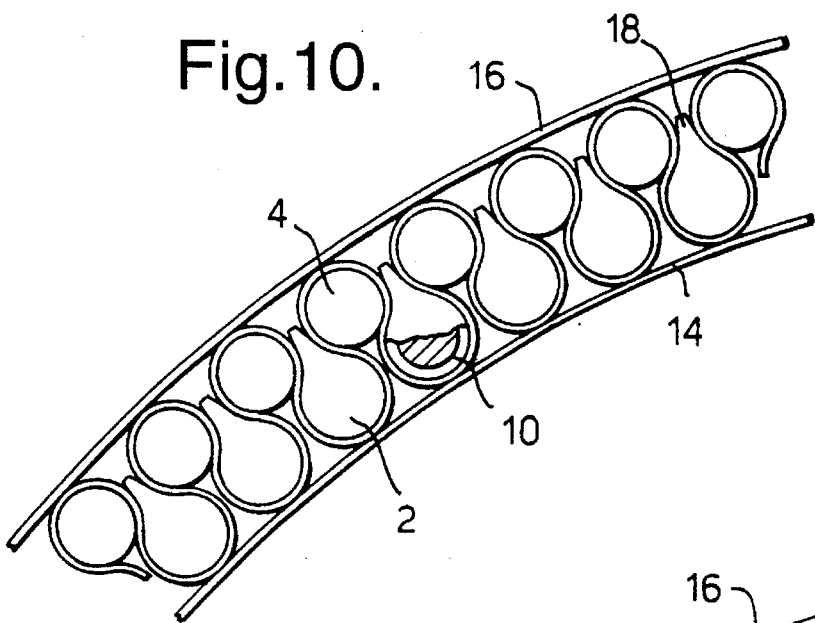
FIG. 10 is a view similar to FIG. 7, showing a further embodiment of the filter structure.
Figure 13:
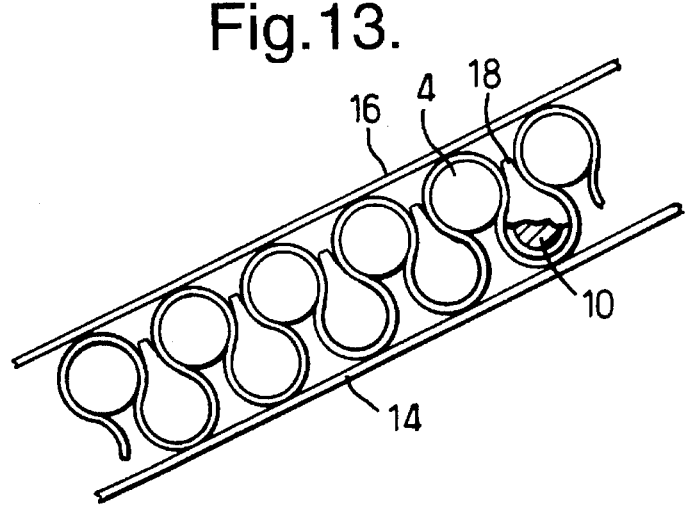
FIG. 13 is a view similar to FIG. 9, showing a further embodiment of the filter structure.

While in the embodiments shown so far, the grooved rods 2 are cylindrical, other profiles, too, can be used, for instance the pear-like profile of rod 2 of FIG. 10 and of FIG. 13, which would substantially increase the support offered to the filter screen 8 by protruding with its neck portion 18 into the space between two rods 4, preferably beyond the center line of the row of rods 4.

Figure 11:
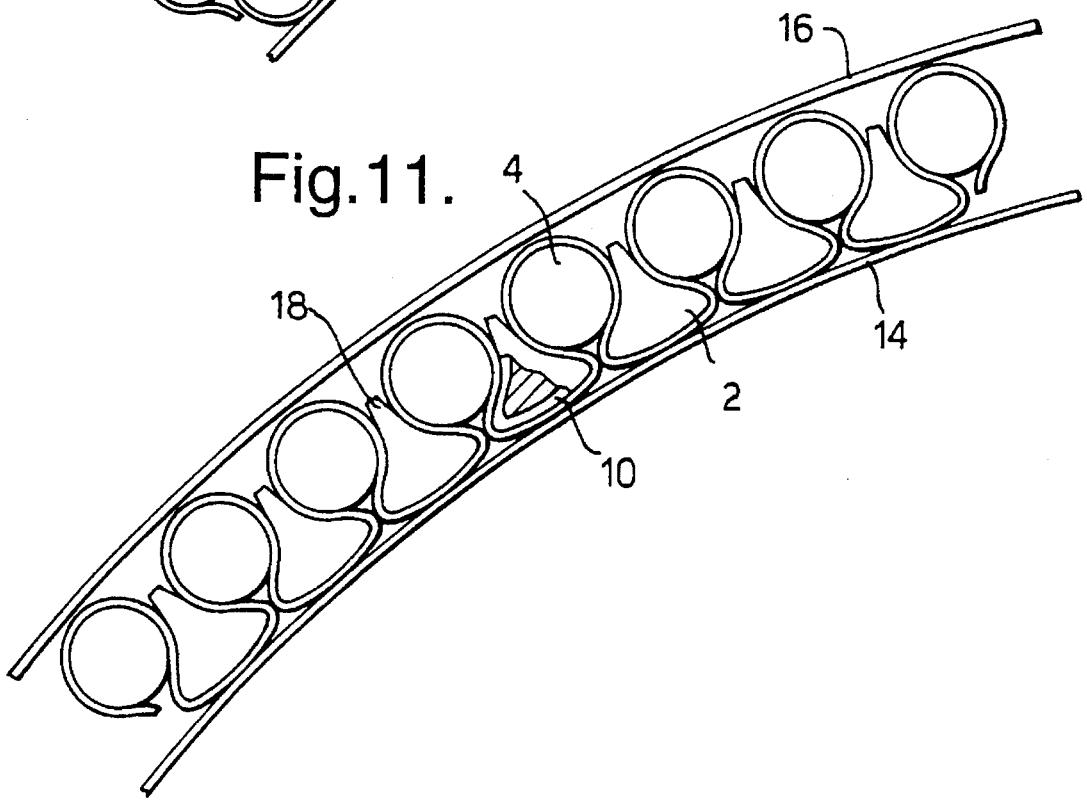
FIG. 11 is a view of a still further modification of the structure of FIG. 10.
Figure 14:
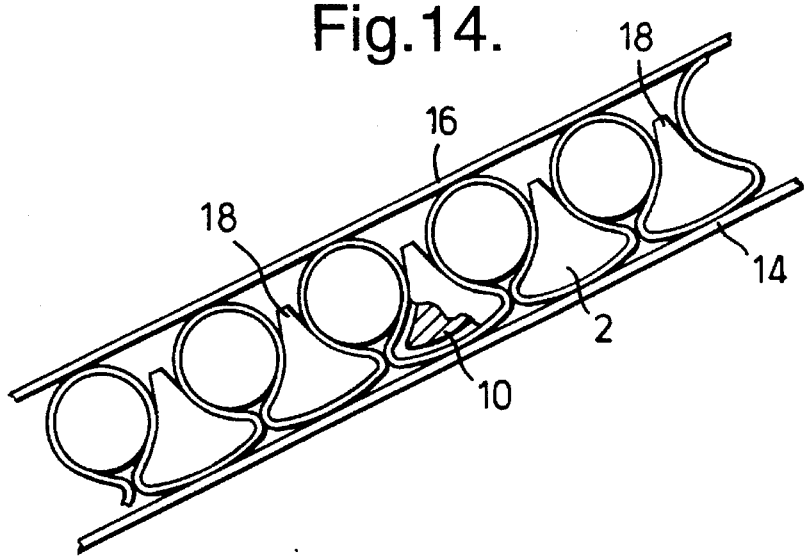
FIG. 14 is a view of a still further modification of the structure of FIG. 13.

In FIG. 11 and FIG. 14, the grooved rod 2 is bell-shaped and, apart from providing increased screen support, exposes a greater portion of the filter screen 8 to the maximum suction effect of the back-flushing nozzle 6 (see FIG. 1).

It will be appreciated that the rods 2, 4 might, in fact, be tubular and that the grooves 10 may have various cross-sections and may be screw-thread-like, i.e., helical.

While the embodiments shown have two rows of rods, located within two concentric cylinders or two parallel planes, an embodiment is also envisaged in which the rods 2, 4 are alternatingly located within a single cylinder or a single plane.

Figure 12:
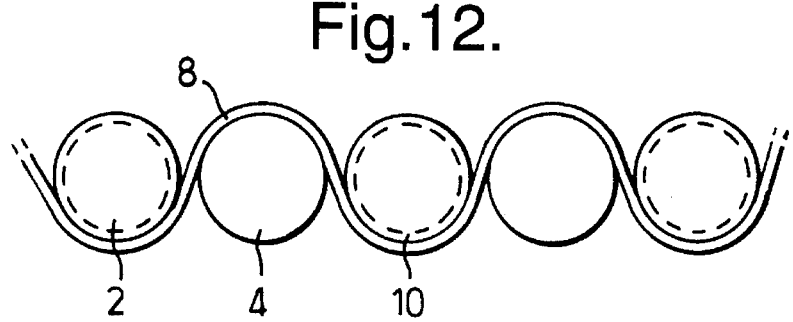
FIG. 12 is a view of an embodiment having only one row of rods.

An embodiment having only a single row of rods is shown in FIG. 12. In this embodiment, rods 2 having grooves 10 are positioned so as to alternate With the positioning of grooveless rods 4. Screen 8 is threaded between rods 2 and rods 4.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A filter screen structure for a backflushed liquid filter having a screen separating a raw-liquid side of said filter from a clean-liquid side of said filter, comprising at least one row of substantially parallel rods extending along said screen, wherein said screen is threaded between said rods, partially enveloping said rods alternatingly from said raw-liquid side of said filter and from said clean-liquid side of said filter, at least some of said rods being provided with substantially circumferential grooves, facilitating the passage of the liquid from said raw-liquid side via said screen to said clean-liquid side.

2. The filter screen structure as claimed in claim 1, wherein said filter screen structure comprises two rows of substantially uniformly spaced rods having axes arranged along first and second concentric circles, respectively, wherein said rows of rods are substantially equally spaced at an angular pitch along said first and second concentric circles, and wherein said rods in said first concentric circle are offset from said rods in said second concentric circle by about half of said angular pitch.

3. The filter screen structure as claimed in claim 2, further comprising a substantially cylindrical grid fitting inside said filter screen structure for the protection thereof.

4. The filter screen structure as claimed in claim 2, further comprising a reinforcing belting helically wrapped around the outside of said structure.

5. The filter screen structure according to claim 2, wherein at least some of said rods in the radially inner one of said rows are provided with neck portions which extend toward the radially outer one of said rows.

6. The filter screen structure as claimed in claim 5, wherein said neck portions protrude beyond said concentric circle along which said axes of said rods in said radially outer one of said rows are arranged.

7. The filter screen structure as claimed in claim 1, wherein said filter screen structure comprises two rows of substantially uniformly spaced rods having axes arranged along first and second parallel lines, respectively, wherein said rows of rods are substantially equally spaced at a linear pitch along said first and second parallel lines, and wherein said rods in said first parallel line are offset from said rods in said second parallel line by about half of said linear pitch.

8. The filter screen structure according to claim 7, wherein at least some of said rods in the first parallel line are provided with neck portions which extend toward the second parallel line.

9. The filter screen structure according to claim 8, wherein said neck portions protrude beyond said second parallel line.

10. The filter screen structure according to claim 1, wherein said grooved rods comprise a circular-shaped profile.

11. The filter screen structure according to claim 1, wherein said grooved rods comprise a pear-shaped profile.

12. The filter screen structure according to claim 1, wherein said grooved rods comprise a bell-shaped profile.

* * * * *